(12) United States Patent
Mandel et al.

(10) Patent No.: US 10,827,372 B2
(45) Date of Patent: Nov. 3, 2020

(54) METHOD AND DEVICE FOR TRANSMITTING DATA WITHIN A VEHICLE

(71) Applicant: TE Connectivity Germany GmbH, Bensheim (DE)

(72) Inventors: Christian Mandel, Darmstadt (DE); Andreas Winkelmann, Sindelfingen (DE); Bert Bergner, Bensheim (DE); Christian Rusch, Schifferstadt (DE)

(73) Assignee: TE Connectivity Germany GmbH, Bensheim (DE)

( * ) Notice: Subject to any disclaimer, the term of this patent is extended or adjusted under 35 U.S.C. 154(b) by 0 days.

(21) Appl. No.: 16/235,106

(22) Filed: Dec. 28, 2018

(65) Prior Publication Data

US 2019/0208434 A1 Jul. 4, 2019

(30) Foreign Application Priority Data

Dec. 29, 2017 (DE) .................. 10 2017 131 416

(51) Int. Cl.
*H04W 4/00* (2018.01)
*H04W 24/08* (2009.01)
*H04W 4/48* (2018.01)
*H04L 27/26* (2006.01)
*H04W 84/12* (2009.01)

(52) U.S. Cl.
CPC ......... *H04W 24/08* (2013.01); *H04L 27/2649* (2013.01); *H04W 4/48* (2018.02); *H04W 84/12* (2013.01)

(58) Field of Classification Search
CPC ... H04L 1/0001; H04L 5/0005; H04L 5/0007; H04L 12/4013; H04L 27/26; H04L 27/2634; H04L 27/2646; H04L 27/2649; H04L 27/265; H04W 4/48; H04W 24/08; H04W 72/08; H04W 84/12
See application file for complete search history.

(56) References Cited

U.S. PATENT DOCUMENTS 5,734,677 A 3/1998 Liew et al.
6,609,039 B1 * 8/2003 Schoen .................. H04H 40/90
370/478
7,088,683 B2 * 8/2006 Sawada ............... H04L 27/2608
370/252

(Continued)

FOREIGN PATENT DOCUMENTS

DE 102016214855 A1 2/2018
JP 61092056 A 5/1986

OTHER PUBLICATIONS

German Office Action, Application No. 10 2017 131 416.4, dated Aug. 3, 2018, 12 pages.

(Continued)

*Primary Examiner* — Frank Duong
(74) *Attorney, Agent, or Firm* — Barley Snyder (57) ABSTRACT

A method for transmitting data within a vehicle comprises evaluating a connection quality of a wireless connection between an antenna arranged external to the vehicle and a receiving unit of the vehicle, demodulating a signal received by the receiving unit, feeding the demodulated signal to a scaling unit, and providing an output data with the scaling unit having a data rate determined as a function of the connection quality.

20 Claims, 5 Drawing Sheets

(56) References Cited

U.S. PATENT DOCUMENTS

| | | | |
|---|---|---|---|
| 7,672,382 B2* | 3/2010 | Yoshida | H04L 27/2647 370/208 |
| 2003/0026201 A1* | 2/2003 | Arnesen | H04L 27/2653 370/210 |
| 2019/0207641 A1* | 7/2019 | Spehl | H04B 1/0003 |

OTHER PUBLICATIONS

Abstract of JP 61092056A, dated May 10, 1986, 1 page.
Abstract of DE 102016214855, dated Feb. 15, 2018, 1 page.

* cited by examiner

METHOD AND DEVICE FOR TRANSMITTING DATA WITHIN A VEHICLE

CROSS-REFERENCE TO RELATED APPLICATION

This application claims the benefit of the filing date under 35 U.S.C. § 119(a)-(d) of German Patent Application No. 102017131416.4, filed on Dec. 29, 2017.

FIELD OF THE INVENTION

The present invention relates to a method and device for transmitting data and, more particularly, to a method and device for transmitting data within a vehicle.

BACKGROUND

Mobile communication in the automobile field is increasingly multifaceted and costly. Different protocols are used, which create different radio communication standards or communication technologies within the vehicle, for example, in the form of mobile communications 3G/4G/5G, vehicle-to-vehicle communication, vehicle-to-infrastructure communication, Bluetooth, WiFi, WLAN, etc., which can be created via respectively allocated antennas. In particular, the 5G connectivity, which will soon be used, requires at least four to eight additional antennae at various positions within the vehicle. A suitable cabling of the antennae is required by coaxial cables with, where necessary, additional intermediate amplifiers. However, despite the increasing electronics, the space allocated for this within the vehicle is limited.

In mobile communications base stations, a baseband chip and frontend chip elements are arranged separated from one another, and said elements are connected via a coaxial cable via which high-frequency (HF) data are transported. The functionalities of the propagation of the data for the baseband and the data transmitted via the antenna are thus implemented in separate elements. In this way, greater flexibility of the system architecture can be achieved (RF2Bits approach). Because of the advantages of the RF2Bits approach, as well as use in mobile communications base stations, use of the design or a derivative of the design in the mobile communications architecture of vehicles is also conceivable.

Wireless connectivity of vehicles is constantly increasing, in particular as a result of a growing number of applications, such as multiple-input multiple-output (MIMO), and therefore requires an increasing number of antennae. A resulting problem is the high data rate for the conventional type of network cables which is required for this approach. In addition, the data rate is linked to electrical power consumption, which is associated with heat losses. For these reasons, but without being limited thereto, the data rate should be kept as low as possible.

A large number of nodes of the network may not be configured to the maximum data rate; in particular in non-critical applications a statistical model may be used as a basis for a maximum data rate which is lower than the total of the maximum data rates of the nodes. For RF2Bits applications, this means that a data rate reduction in individual nodes has to be possible.

U.S. Pat. No. 5,734,677 discloses a method for compressing loss-tolerant video image data from a plurality of sources. In this context, the data are segmented into blocks, a distortion metric which represents a data quality being contained in the blocks. In the case of limited bandwidth, the least significant bits of the blocks having the lowest distortion metric are dropped, and bandwidth is accorded to other blocks having the highest distortion metric.

Japanese Patent Application Publication No. 6192056 A discloses a combined speech/data network control system, a method for improving data traffic characteristics being taught within networks in regions of high data traffic occurrence.

SUMMARY

A method for transmitting data within a vehicle comprises evaluating a connection quality of a wireless connection between an antenna arranged external to the vehicle and a receiving unit of the vehicle, demodulating a signal received by the receiving unit, feeding the demodulated signal to a scaling unit, and providing an output data with the scaling unit having a data rate determined as a function of the connection quality.

BRIEF DESCRIPTION OF THE DRAWINGS

The invention will now be described by way of example with reference to the accompanying Figures, of which.

DETAILED DESCRIPTION OF THE EMBODIMENT(S)

Embodiments of the present invention will be described hereinafter in detail with reference to the attached drawings, wherein like reference numerals refer to the like elements. The present invention may, however, be embodied in many different forms and should not be construed as being limited to the embodiments set forth herein; rather, these embodiments are provided so that the disclosure will convey the concept of the invention to those skilled in the art.

Figure 1:
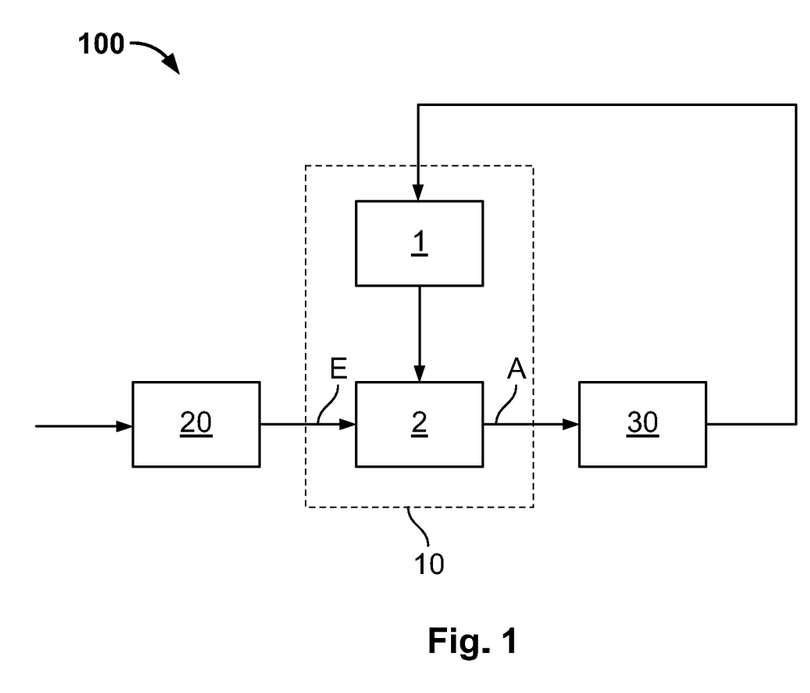
FIG. 1 is a block diagram of a receiving system according to an embodiment.

A device 10 according to an embodiment for transmitting data within a vehicle is shown in FIG. 1. The vehicle (not shown) may be a motor vehicle such as a land vehicle, a watercraft, or an aircraft. A receiving unit 100 shown in FIG. 1 includes the device 10, a demodulation unit 20 functionally connected to a scaling unit 2 of the device 10, and modulation unit 30 functionally connected to the scaling unit 2.

At the demodulation unit 20, data are fed to an antenna (not shown) arranged external to the vehicle and fed demodulated to the scaling unit 2 as input data E shown in FIG. 1. A connection quality of the connection between the external antenna and the receiving unit 100 is evaluated by an evaluation unit 1 of the device 10. The scaling unit 2 is operated in such a way that a data rate of output data A of the scaling unit 2 is adapted to the determined connection quality such that modulation of the output data A is still possible. The output data A are fed to the modulation unit 30, which provides the payload data, for example for a car radio, mobile communications device, etc. of the vehicle. The output data A of the scaling unit 2 are transmitted in an intermediate format, so that the transmission quality is such that the payload data are available at full quality. In this way, a type of "artificial worsening" of the transmission quality is provided, but is only implemented in an intermediate format and the actual signal quality is not impaired. As a result, a data rate can be reduced, and wired connections within the vehicle can be configured economically.

Figure 2:
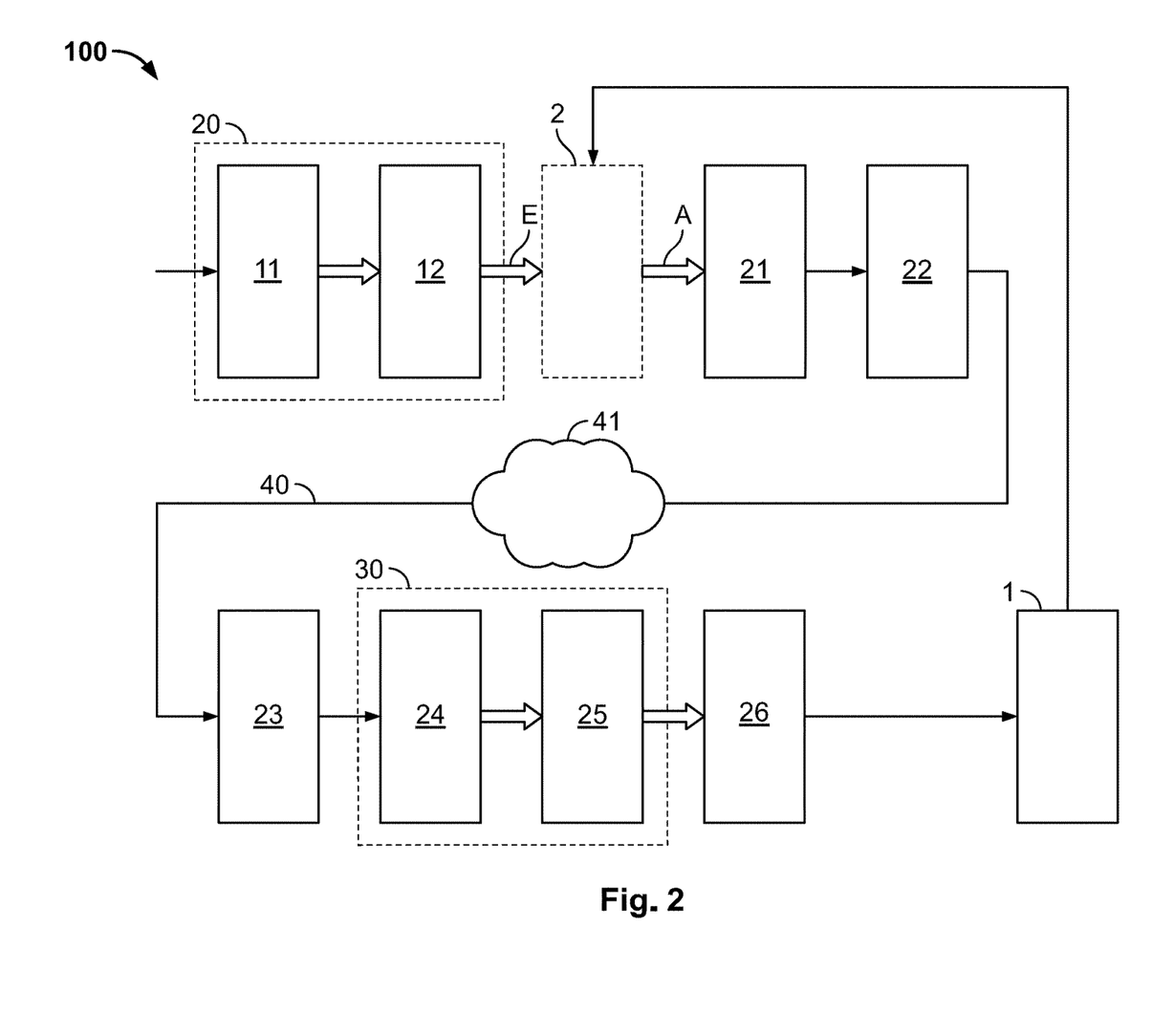
FIG. 2 is a block diagram of the receiving system at a higher level of detail.

The receiving unit 100 is shown in greater detail in FIG. 2. The demodulation unit 20 includes a serial/parallel converter 11 connected to a first transformation element 12. In an embodiment, the first transformation element 12 implements an inverse Fourier transform. From the output of the first transformation element 12, the data are fed to the scaling unit 2. As a function of the connection quality evaluated by the evaluation unit 1, the scaling unit 2 outputs a data rate, the output data being transmitted to a parallel/serial converter 21 functionally connected to a first transmission element 22. Between the first transmission element 22 and a second transmission element 23, a cable 40 is arranged, via which the data are transmitted within the vehicle. In an embodiment, the first and the second transmission element 22, 23 are formed as physical layer implementation elements ("phy"), which can implement a baseband transmission or a carrier frequency method.

The cable 40, shown in FIG. 2, is one of a two-wire line, a four-wire line, a coaxial line, and a waveguide. The cable 40 is easy to lay within the vehicle and has favorable transmission properties, such as low attenuation and power losses for the transmission of the digital data within the vehicle. Further, with the aforementioned data lines, additional compensation amplifiers or intermediate amplifiers are not required, and this advantageously saves installation space within the vehicle.

In the embodiment shown in FIG. 2, an on-board network 41 is provided within the motor vehicle. With the on-board network 41, the average data rate of the individual components can decrease and the on-board network 41 can thus be configured more flexibly.

From the second transmission element 23, as shown in FIG. 2, the data are fed to a serial/parallel converter 24 of the modulation unit 30, which transmits the data to a second transformation element 25 of the modulation unit 30. In an embodiment, the second transformation element 25 implements a fast Fourier transform. From the output of the second transformation element 25, the data are fed to a parallel/serial converter 26 functionally connected to the evaluation unit 1. As a result, the demodulation unit 20 is implemented by the serial/parallel converter 11 and the first transformation element 12, and the modulation unit 30 is implemented by the serial/parallel converter 24 and the second transformation element 25.

The data rate of the output data A is adapted by the scaling unit 2 for transmission by the digital transmission elements 22, 23 in such a way that cost-effective transmission elements 22, 23 can be used as a result of the data rate, which is reduced on average, for the transmission of the data within the vehicle. Adaptation of the data rate may be achieved by adapting a data width at the output of the scaling unit 2. Further, it is also possible alternatively or in addition to make an intervention in a coding format so that not all elements of a specific code are still transmitted. Further, it is also possible, alternatively or in addition, to transmit elements of transformations in a weighted manner. A principle common to all mentioned principles is that the data are available at the output of the parallel/serial converter 26 without a loss of payload data.

The data rate is provided in such a way that a signal/noise ratio of the demodulated signal E is taken into account so as to configure the data rate in such a way that the output data A are decodable. In this way, a minimum dynamic, which must not fall below the input signal E, is taken into account in order that the output data A can still be decoded and a loss of payload data is prevented.

Figure 3:
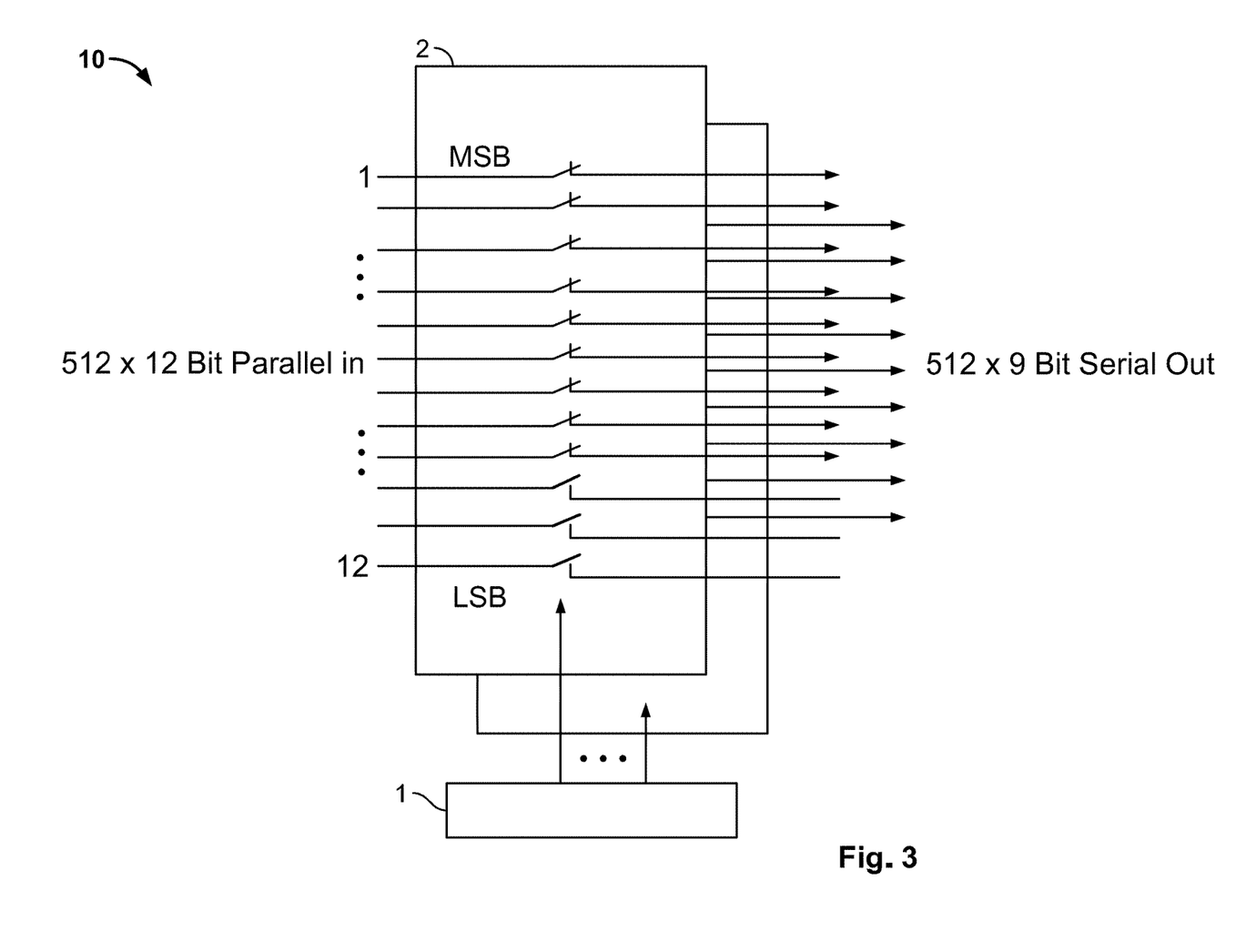
FIG. 3 is a block diagram of a scaling unit of a device of the receiving system.

The scaling unit 2 that adapts a data width as a function of the evaluated connection quality is shown in FIG. 3. As shown in FIG. 3, 512×12 bit parallel input data E are fed to the scaling unit 2. As a function of the determined connection quality determined by the evaluation unit 1, defined bits, least significant bits (LSBs) in an embodiment, are deactivated or switched off, so that as a result a serial 512×9 bit data word is available at the output of the scaling unit 2. In the event of poor connection quality, no bits are deactivated, and so the entirety of the serial 512×12 bits are available at the output of the scaling unit 2. In this way, "artificial noise" in the form of quantisation noise is added to the output signal. In principle, as a result, an approach reciprocal to the approach known per se of automatic gain control is used to provide the data rates of the output data.

Figure 4:
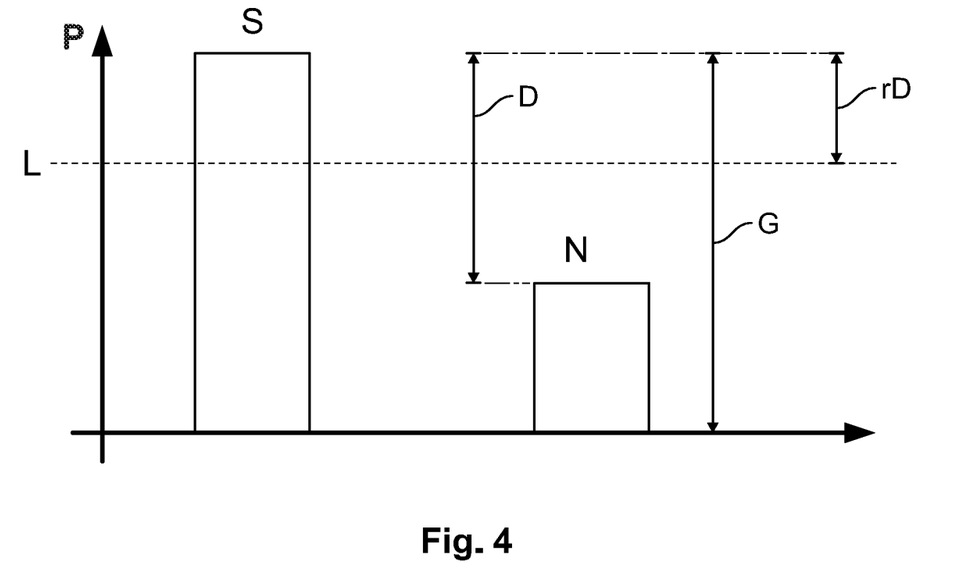
FIG. 4 is a graph of a first mode of operation of the device.
Figure 5:
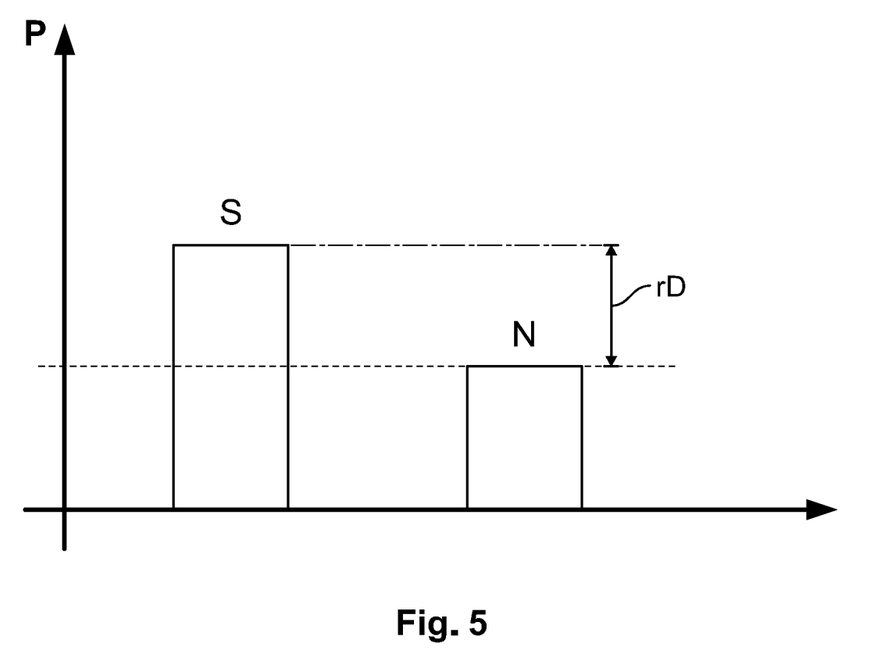
FIG. 5 is a graph of a second mode of operation of the device.

The principle by which the data rate is adapted by the scaling unit 2 will be described in greater detail with reference to FIGS. 4 and 5. FIGS. 4 and 5 show a signal power S and a noise power N of an output signal of the modulation unit 30; a noise limit L of the output signal is also shown. A dynamic D corresponds to a difference between the maximum noise power N and the maximum signal power S and a required dynamic rD corresponds to the difference between the noise limit L and the maximum signal power S. A precision G corresponds to a maximum amplitude of the signal power S. The dynamic D can be reduced from the state shown in FIG. 4 by the device 10 and the data rate can thus be reduced in accordance with the described method until the signal dynamic D and required dynamic rD match or equal one another. FIG. 5 shows a case where the required dynamic rD is lower, but at the same time the available dynamic D is too low. In the state of FIG. 5 it is not possible to make an intervention in the data rate, and the data rate cannot be reduced.

The device 10 converts the high-frequency data received by the external antenna into digital data, the digital data being provided and distributed within the vehicle in an efficient manner. In this way, actuation lines for the aforementioned various antennae are implemented, via which the digital data can be transmitted in accordance with different data communications protocols. The device 10 has been described for a receiving path of a receiving unit, but is also applicable to a transmission path of a transmission unit.

Advantageously, with the device 10, use of inflexible coaxial cables sensitive to mechanical damage within the vehicle can be greatly reduced or even entirely eliminated. Use of the device 10 is conceivable even in industrial applications where use of delicate coaxial cables is not reasonable or expedient. Conventional data cables for high data rates are generally also "sensitive" cables, coaxial lines or twinax lines. As a result of the use of existing infrastructure and link aggregation, entire links can be omitted using the device 10, in particular the highly demanding carrier frequency links, or may at least be replaced with correspondingly more favorable links (generally, but not exclusively, baseband links). Improved transmission of digital data within the vehicle is possible using the device 10 with simultaneous flexible configuration of a hardware architecture and a saving in electronic components.

The method of the device 10 solves the problem that individual link data rates of individual RF2Bits nodes can implement the maximum data rates thereof, even though said maximum data rate is only required in a comparatively low proportion of the operating time of the node. The maximum data rate of an individual node may be specified by an analogue-to-digital converter or by a digital-to-analogue converter resolution or the input data widths thereof, which can likewise be converted to a resolution. This resolution is not required in the case of high connection quality, for example if there is an LTE base station antenna positioned close to the vehicle. On the basis of the evaluation of the connection quality, the data rate of the underlying network can be reduced in a simple manner, for example by deactivating a defined number of least significant bits (LSBs) of the signal to be detected. Deactivating one bit of a 12-bit data converter can bring about an approximately 8% reduction in the data rate, it being possible to influence the reduction in the data rate linearly by deactivating a plurality of bits.

The scaling unit 2 removes some of the least significant bits on the basis of the evaluation, performed by the evaluation unit 1, of the connection quality at the input. The subsequent data are fed to the downstream parallel/serial converter 21, which depending on the implementation has mapping and frame-formation functionality, and the missing bits are correspondingly taken into account. In this way, the bit rate transmitted via the subsequent backbone network is reduced. These steps can be implemented in a simple manner in the control loop described above.

In an embodiment, integer values are transmitted as output data A. If non-integer values are transmitted, the method using the device 10 can be adapted in a simple manner to the data format to be transmitted. In an alternative implementation, signal components, for example Fourier components, can be weighted by importance, it being possible for least significant bits to be omitted accordingly in this case too.

The data can be received and transmitted in orthogonal frequency division multiplexing (OFDM) format and processed by the device 10 in the aforementioned manner. Further, by the proposed method, a wide range of data formats can be processed, for example in the form of integer numbers, floating-point numbers etc. In an embodiment, defined number formats of the output data are provided as output data.

With the device 10, it is possible to reduce a data rate transmitted on the cable 40, making it possible to use technically simpler, cost-effective data cables. Using said data cables, a reduced electrical power consumption and thus lower heat losses can be implemented. A capacity of the backbone network in the vehicle can be freed up for other applications, which run via the same backbone network and which would otherwise be blocked by reason of low priority and an overloaded network.

Figure 6:
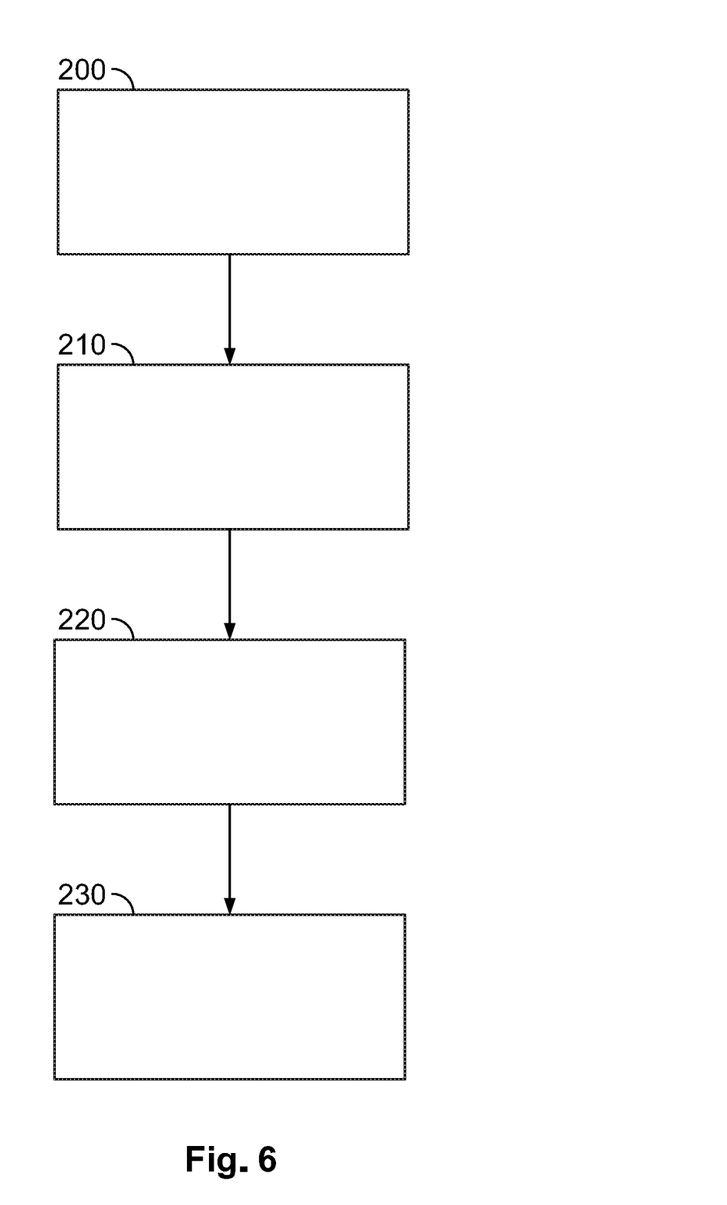
FIG. 6 is a flowchart of a method of using the device according to an embodiment.

A method of using the device 10 for transmitting data within a vehicle is shown in FIG. 6. In a step 200, a connection quality of a wireless connection between an antenna arranged external to the vehicle and the receiving unit 100 of the vehicle is evaluated. In a step 210, a signal received by the receiving unit 100 is demodulated at the demodulation unit 20. In a step 220, the demodulated signal is fed to a scaling unit 2. In a step 230, a data rate of output data A of the scaling unit 2 is provided as a function of the evaluated connection quality.

In an embodiment, the method is configured as software which runs on the device 10 and which can be altered and adapted in a simple manner using suitable programming means. The method is stored as computer readable code on a non-transitory computer readable medium of the device 10 and is executed by a processor of the device 10 in order for the device 10 to perform the steps of the method.

What is claimed is:

1. A method for transmitting data within a vehicle, comprising:
   evaluating, with an evaluation unit, a connection quality of a wireless connection between an antenna arranged external to the vehicle and a receiving unit of the vehicle;
   demodulating, with a demodulation unit, a signal received by the receiving unit;
   outputting from the demodulation unit the demodulated signal to a scaling unit; and
   adapting a data rate of the demodulated signal with the scaling unit for generating output data, the data rate of the output data determined as a function of the evaluated connection quality.

2. The method of claim 1, wherein a signal/noise ratio of the demodulated signal is taken into account in the data rate.

3. The method of claim 1, further comprising the step of transmitting the output data to a device of the vehicle, wherein the output data comprises payload data utilized by the device.

4. The method of claim 1, wherein a data width of the output data is determined as a function of the connection quality.

5. The method of claim 1, wherein the output data has a plurality of defined number formats.

6. The method of claim 5, wherein the data rate of the output data is reduced by intervening in a number format or a coding of the output data.

7. The method of claim 6, wherein the receiving unit receives data from the antenna in an orthogonal frequency division multiplexing format.

8. The method of claim 1, wherein the step of adapting a data rate of the demodulated signal includes deactivating one or more least significant bits (LSBs) of the demodulated signal.

9. A device for transmitting data within a vehicle, comprising:
   an evaluation unit for evaluating a connection quality of a wireless connection between an external antenna and a receiving unit of the vehicle; and
   a scaling unit receiving a demodulated signal from a demodulation unit and providing an output data having a data rate determined as a function of the evaluated connection quality.

10. The device of claim 9, wherein the device is part of a receiving unit or a transmission unit of the vehicle.

11. The device of claim 9, wherein the scaling unit adapts the data rate of the demodulated signal by selectively activating or deactivating one or more least significant bits (LSBs) of the demodulated signal.

12. The device of claim 9, wherein the evaluation unit is operatively connected to the scaling unit for receiving the output data.

13. The device of claim 9, wherein the demodulation unit comprises a first serial/parallel converter connected to a first transformation element implementing an inverse Fourier transform.

14. The device of claim 13, further comprising a first transmission element and a first parallel/serial converter, wherein the scaling unit outputs the output data to the first transmission element via the first parallel/serial converter.

15. The device of claim 14, further comprising a second transmission element arranged within the vehicle and operatively connected to the first transmission element for receiving the output data.

16. The device of claim 15, further comprising a modulation unit responsive to an output of the second transmission element, the modulation unit including a second serial/parallel converter and a second transformation element implementing a fast Fourier transform.

17. The device of claim 16, wherein the second transformation element is functionally connected to the evaluation unit via a second parallel/serial converter.

18. A computer program product stored on a non-transitory computer readable medium and executable by a processor to perform the steps of:

evaluating a connection quality of a wireless connection between an antenna arranged external to a vehicle and a receiving unit of the vehicle with an evaluation unit;

demodulating a signal received by the receiving unit with a demodulation unit;

feeding the demodulated signal to a scaling unit with the demodulation unit; and adapting a data rate of the demodulated signal with the scaling unit for generating output data, the data rate determined as a function of the evaluated connection quality.

19. The computer program product of claim 18, wherein the step of adapting a data rate of the demodulated signal includes deactivating one or more bits of the demodulated signal.

20. The computer program product of claim 19, wherein the one or more bits comprise one or more least significant bits (LSBs) of the demodulated signal.

* * * * *